May 14, 1963 D. SCARAMUCCI 3,089,713
SWIVEL JOINT OR COUPLING FOR PIPE LINES
Filed July 10, 1958 2 Sheets-Sheet 1

INVENTOR
DOMER SCARAMUCCI
BY Leech & Radue
ATTORNEYS

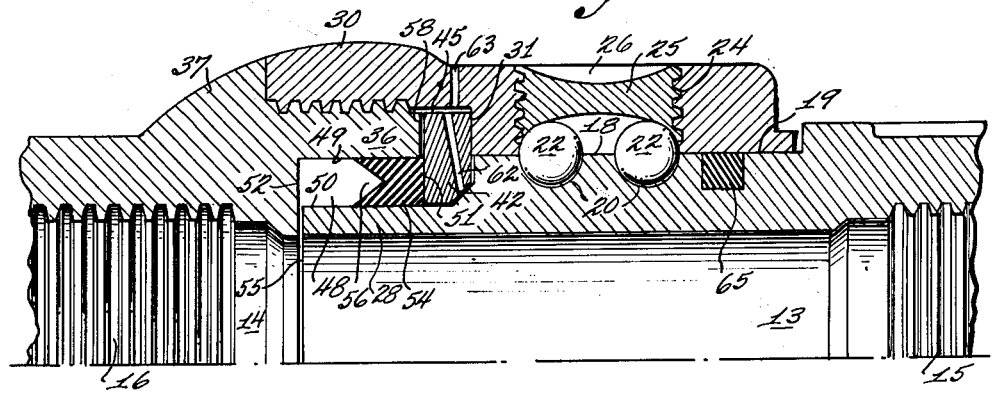
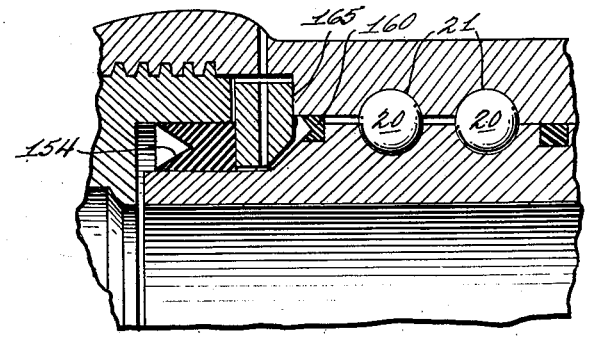
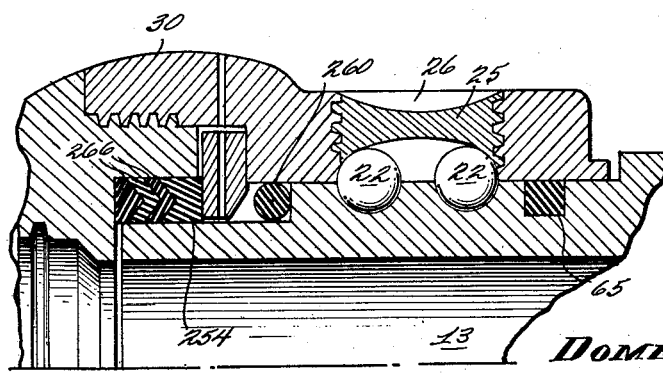

3,089,713
Patented May 14, 1963

3,089,713
SWIVEL JOINT OR COUPLING FOR PIPE LINES
Domer Scaramucci, P.O. Box 4446, Oklahoma City, Okla.
Filed July 10, 1958, Ser. No. 747,767
6 Claims. (Cl. 285—14)

This invention relates to swivel pipe couplings and more particularly to such couplings having ball-bearings connecting inner and outer relatively rotatable members between which a unique arrangement of packing means provides for minimum packing diameter, low rotational resistance, minimum thrust from fluid pressure and many other advantages.

It is a general object of the present invention to provide a novel and improved swivel pipe coupling adapted, with interchangeable packings, for use with high or low pressure or high temperature fluids.

More particularly it is an object of the invention to provide a swivel coupling of the type described in which a floating flange shoulders on the outer coupling member, extends within the outer diameter of the inner member and is end abutted by a packing surrounding a reduced stem on the inner member and expanded by the pressure of the confined fluid into engagement with the wall of a surrounding bore in the outer member.

An important object of the invention consists in reducing the longitudinal or thrust load on the bearings between the two parts of the swivel by reducing the packing diameter to a minimum and transmitting the longitudinal fluid thrust thereon to the outer rotatable member.

Another object of the invention resides in the construction of the outer coupling member in two parts threaded together for separation to permit inspection and renewal of the packing and floating flange without disassembling the bearing connected parts of the coupling.

Still another object of the invention resides in the arrangement of seals and vents whereby piped fluid leaking by the main seal, when worn, is excluded from the bearing and vented to atmosphere.

A further object of the invention lies in the arrangement of the inner and outer members and the packing whereby relative movement occurs only between the smallest diameter engaging surfaces whereby minimum friction is caused and ease of rotation assured.

A still further object of the invention lies in the construction and arrangement of the coupling components whereby the packing and the flange inner diameters are substantially less than the centerline inner periphery of the bearings to reduce rotational drag.

A very important object of the invention consists in the arrangement of the bearing and packing components of the swivel joint which makes for universal use thereof with only a change in the material of the packing, including adequate lateral clearance for low pressure operation; minimum thrust, low rotational friction etc. for high pressure operation; automatic compensation for bearing wear to avoid adjustment provisions for all types of use; and the provision of a normally inactive, self-compensating secondary packing which normally outlasts the main packing and assures position shutoff against bearing contamination by the conducted fluid even under high temperature conditions.

A still further important object of the invention consists in the two part formation of the outer swivel member to provide for packing and flange break-out, wherein the threaded connection is of the shouldered speed type for tight, quick, make-up since neither adjustment nor packing provision therefor is required.

Other and further objects and features of the invention will be more apparent to those skilled in the art upon a consideration of the accompanying drawings and following specification wherein are disclosed several exemplary embodiments of the invention with the understanding that such changes and modifications may be made therein as fall within the scope of the appended claims without departing from the spirit of the invention.

In said drawings:

FIGURE 4 is a fragmentary view similar to FIGURE 2, on a much enlarged scale, showing swivel type without secondary packing;

FIGURE 5 is an even more fragmentary view of the style of FIGURE 4 but showing a different type of secondary packing than in FIGURE 2, the section being taken through the ball races remote from the filler plug; and FIGURE 6 is a view similar to FIGURES 4 and 5 showing different forms of packings.

Figure 1:
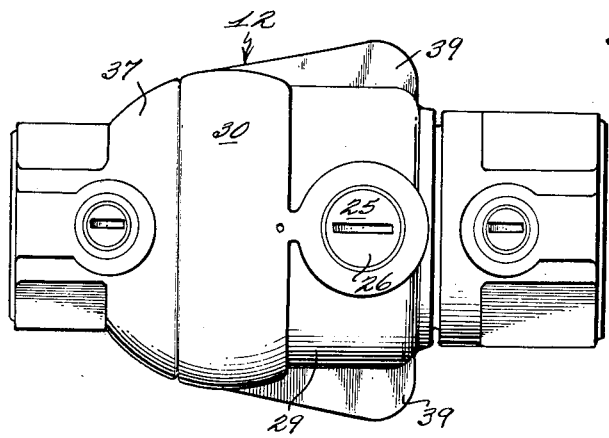
FIGURE 1 is an elevation of a straight-through type of swivel coupling or joint constructed in accordance with the present invention.

A ball-bearing swivel pipe joint, as used alone or made up into various combinations for multi-plane swivelling to conduct liquids or gases, provides piping flexibility in the form of 360° rotation in one, two and three planes. For broad use application swivels must meet service conditions involving low, high, and extra-high pressures, low, medium and high temperatures and be resistant to fluids, gases and combinations thereof and yet must be rugged, relatively low in cost, easy to service and be able to provide service flexibility with a minimum of stock investment on the part of suppliers.

An important factor in controlling the design of a swivel pipe joint for use alone or as a component of a multi-swivel fitting is the requirement for bridging the pressure-service range from high to low and the low to high temperature range without the requirement of more than a simple change in a readily removable packing.

Swivels are subjected to both thrust and deflecting loads and it is important that both be taken care of in a manner resisting rapid wear, particularly in the bearings, for such wear permits relative movement other than rotational between the inner and outer members of the swivel, promotes high friction and is destructive of the packing components. The type of bearing favored by most users to take care of the several forms of loads is the double-row ball-bearing. This arrangement occurs in general in two forms, in the first of which the thrust loading is shared by both rows of balls with the bearings rolling in deep races to form a wide line of contact. In the second type the thrust is concentrated on a single row of bearings rolling on hardened flat races to form a narrow line of contact. With a deflecting load in the first type the pressures are concentrated on a half-circle of bearing in one row and on the opposite half in the other row, while in the second type such a load reflects in thrust on a few balls in each of the two rows, together with a radial load on other balls in the rows and forming a narrow line of contact against the usually unhardened cylindrical walls of the main members of the swivel.

The present invention incorporates the first type of bearing principle as representing the best design in handling high pressure thrust load as well as deflecting or radial loading, which latter is encountered to the greatest extent in low pressure applications. This construction affords greater production economy and less ultimate wear for the same amount of use.

Manufacturers, in meeting expanding service range demands have included many different designs in their line of swivels thus tending further to complicate production and inventory programs. In addition to the several types of bearings noted, the packing chamber principles selected by the various manufacturers control the design, type and construction of the principal remaining portions of the pipe swivel assembly. In spite of the fact that bearings and packings do wear and in some instances very rapidly, nevertheless many commercial forms of fittings not only promote high thrust and friction and hence require great effort in their use but many require that the whole bearing be dismantled for packing replacement. Other types of popular packing and chamber principles require dismantling for bearing wear take-up or include the necessity of providing some means to adjust for bearing wear and clearances.

Most of the better known forms of joints present a serious disadvantage in permitting leakage, upon packing failure, to migrate into and contaminate the lubricant in the bearing housing. This not only results in serious bearing wear and excessive torque problems but requires frequent renewal of lubricant.

In the present invention use is made of a common mechanical construction for all temperature and pressure services, requiring only changes in the packing material, thereby greatly reducing the total number of devices which must be kept in stock to meet purchasers' demand. No adjustments are necessary in the construction proposed, since bearing wear is compensated automatically to avoid this, while at the same time lower thrust and rotational friction provide superior torque qualities while materially reducing the rate of packing wear.

Incorporating a separable flange makes a second packing, to prevent bearing contamination, practical since it can be inspected or replaced along with the main packing. The secondary chamber and packing conform to the bearing wear compensating features of the main packing and chamber type and like it require no adjustment. The secondary packing is normally inactive, so outlasts the main packing but ensures positive shut-off against bearing contamination which avoids dismantling the swivel to clean the bearings, contributes to long bearing life, reduces torque and ensures the maintenance of lubrication.

For a better understanding of the features which contribute to and make possible the advantages enumerated above, reference should first be had to FIGURES 1, 2 and 3 of the drawings for a general understanding of the invention and later to the three remaining figures for detailed features of the components in several forms.

As viewed in the first three figures there is illustrated, for example only, a straight through form of swivel coupling, capable as will be recognized, of being made up into many combinations such as required in various usages. Such a swivel includes two basic parts, an internal or tube member 10 and an outer or sleeve member 12, each having a bore 13, 14, respectively, aligned as shown when in use, and each fitted at one end with an internal thread 15, 16, respectively, as shown if the intent is for use with threaded pipe ends. It will be appreciated that other fastenings such as welding or bolt flanges may be resorted to as is common practice.

The principal parts of the two components are partially telescoped, for which purpose the center of the inner member has the outer cylindrical surface 18 and the outer member has the cylindrical bore 19 at one end thereof just sufficiently larger in diameter than 18 to accommodate the latter with appropriate working clearances. These surfaces are conveniently co-axial with bores 13 and 14.

Each of the surfaces 18 and 19 is broken by a pair of equally spaced circumferential grooves 20, 21, each substantially semi-circular in cross-section, so that when mated races circular in cross-section are provided to accommodate a plurality of hardened steel balls 22 constituting with their races 20 and 21 a pair of spaced ball-bearings capable of resisting thrust, lateral, and deflecting loads in well recognized manner.

To contribute to the simplicity of construction the parts are arranged to be telescoped prior to the insertion of the balls 22 in the two races through the large radial circular bore 24 in the outer member. This is then closed by means of a plug 25 threaded into position as shown and terminating against a stop as shown, a suitable kerf 26 being provided in the outer surface of the plug for receiving a tool for its insertion or removal.

At the time of loading the balls into position they are carefully packed with suitable grease which, as will be later described, serves for a long period and need only be renewed after extremely long and arduous service.

Figure 2:
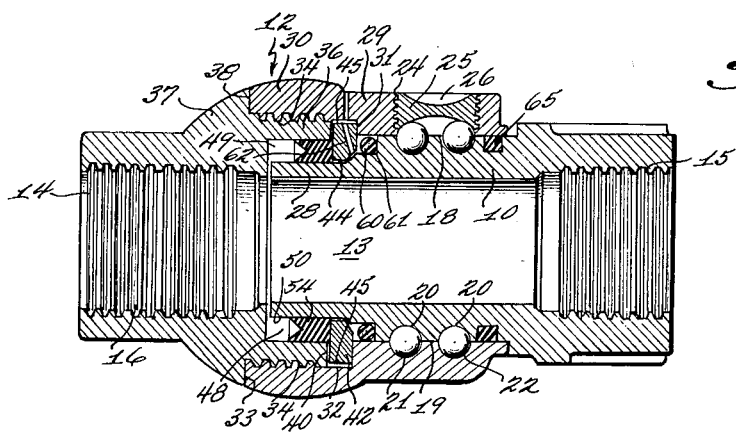
FIGURE 2 is a longitudinal, central section therethrough oriented to show the bearing ball filler plug.

The portion of the inner swivel tube which extends to the left, as seen in FIGURE 2, from the bearings is reduced in external diameter leaving only the relatively thin walled stem 28 of sufficient strength to support the packing which is fitted about the stem in a chamber formed between it and the wall of a counterbore in the outer swivel member.

To permit packing to be inserted and replaced both in the main packing chamber and in a secondary packing chamber and to permit the assembly of the radial faced flange, previously mentioned, the outer swivel member 12 is formed in two parts, the first, numbered 29, including the sleeve portion having the bearing area 19 with races for the ball-bearings and the coupling section 30, beyond radial shoulder 31, and is counterbored as at 32. This counterbore has smooth walls for a short distance and is then threaded internally, as shown at 34, to its shouldered end 33, to receive the corresponding thread on the stem portion 36 of second part 37 of the outer swivel member. This part carries the bore 14 and the internal threads 16, and is counterbored as shown. At the end of its threaded section 34 is a radial shoulder 38 adapted to abut shoulder 33 to limit the insertion of the threaded part 36 into the main part 29 and to frictionally hold the parts together. This threaded portion has a squared-off end 40, which, because of the engagement of shoulders 33 and 38 is limited in its approach to the radial face 31 in the main portion 29.

Figure 3:
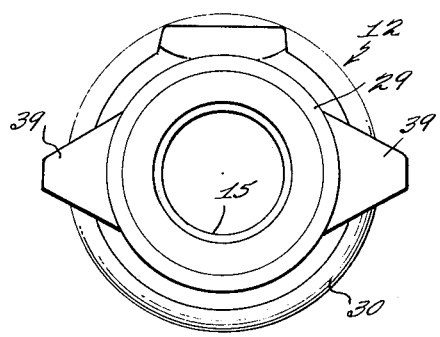
FIGURE 3 is a left end elevation thereof.

For convenience of assembly and to ensure adequate locking friction between the shoulders 33 and 38 the part 29 is equipped with a pair of integral wings or hammer lugs 39 seen in FIGURES 1 and 3 located principally in the bearing area of the sleeve. The threaded connection between the two parts 29 and 37 of the outer element of the swivel surrounds the packing chamber which affords the minimum diameter for the same.

The spacing between threaded sleeve end 40 and shoulder 31 is just slightly more than the thickness of the parallel-sided flange washer 42 which is adapted to be received in this space. This flange element has an internal bore 44 only slightly greater in diameter than the stem 28 of the main section 29 of the swivel and a considerably less outer diameter 45 than the counter-bore 32 in the extension from sleeve portion 29. Thus the flange 42 because of its working fit on stem 28 may move radially with the stem in respect to part 29. It may also move longitudinally, within limits, but under no circumstances will produce any binding between the relatively rotatable inner and outer coupling members. Only the outer portion of the right face of the flange bears on shoulder 31 and since the bore of the stem portion 36 extending from part 37 is not much different from the bore 19 of part 29 the flange projects inwardly a substantial distance, almost to the surface of the tail portion 28 as clearly seen without engagement with rigid parts.

The end 40 of stem 36 neither engages nor provides much spacing between itself and the left face of flange 42 whereby the latter may be said to "float."

The principal packing chamber 48 is defined, as best seen in FIG. 4, by the inner wall 49 of the stem 36 of part 37, the concentric outer surface 50 of stem 28 extending to the left from the main portion of the inner swivel part, the radial wall 51 of packing flange 42 and the opposing radial wall 52 extending between the inner wall 49 of extension 36 and bore 14 in part 37. This annular compartment, substantially rectangular in cross-section, accommodates the main packing 54 whose material and characteristics are dictated by the use to which the swivel is to be put. Packing 54 is a ring substantially rectangular in cross-section having a reasonably close fit against walls 49 and 50. Its flat face is forced against radial surface 51 of the flange by the action of liquid or gas carried in the coupling which has access through space 55 to the left end of the packing which is fitted with a V-notch 56 as shown.

The pressure of the fluid in passage 55 and in V-notch 56 forces the packing tightly against the radial face of flange 42 and the latter's right face against shoulder 31 in the outer sleeve of the coupling so that longitudinal thrust resulting from the pressure of the carried fluid is largely absorbed in the outer member of the coupling and not between the two members to thereby offer friction and resistance to rotation.

The pressure exerted in the groove of the packing causes its lips to expand against the circumferential walls 49 and 50, but since the circumference of 49 is so much greater than that of 50 the packing remains stationary in respect to the extension 36 and any relative rotation between the parts of the coupling takes place between stem 28 and the inner circumference of packing 54.

There is no relative movement between the packing and the face of the flange nor between the flange and the outer member of the coupling, even through the flange is not clamped, but has a running clearance 58 between its left face, beyond the radius of the packing, and the end of extension 36. The pressure of the packing forces the right face of the flange against surface 31 to prevent flange rotation in respect to the outer member 12 of coupling.

The packing chamber must have walls which are relatively movable, but with the present construction the clearances are accurately controlled and not subject to change in width on relative radial movement of the components of the swivel. This ensures against extrusion of the packing, tearing, excessive wear and other damage and contributes to its long life.

The total thrust of the fluid, tending to separate the members of the swivel coupling longitudinally and resisted by the ball-bearings, is exerted on the annular area at the end of stem 28 and this is of minimum diameter in respect to the bore of the coupling both internally and externally.

If after a long period of use the packing 54 begins to fail and seepage of carried fluid enters the clearance space between stem 28 and the annular inner face of the flange this liquid is excluded from the bearings where it would contaminate or wash out the grease, by means of secondary packing 60 shown in FIGURE 2 as an O-ring arranged in an annular compartment 61 formed in the inner coupling member between the right face of the flange and the left ball-bearings.

This packing which fits between the inner wall of its compartment and the bore of the outer section of the swivel is never called on to resist any substantial fluid pressure because the space to its left is vented to atmosphere through a bore 62 having a radial component extending from the inner wall of the flange to its outer wall. The inner wall is shown as having a chamfered right corner which allows added strength at the junction of stem 28 with the portion 18 of the inner coupling member. A radial bore 63 connects the clearance space between the outer surface of the flange and its chamber wall to atmosphere so that any leakage between the main packing and the stem passes through passages 62 and 63 while any leakage between the packing and surface 49 passes through 63 only via 58. In either event the fluid escapes without providing any substantial pressure or load on packing 60 which thus has an extremely long life while at all times serving to protect the lubricant and the bearings between the two parts of the coupling.

This lubricant is prevented from leaking out through the openings 62 and 63 by means of packing 60 and prevented from migrating to the right and escaping by means of a square-section packing 65 recessed in a correspondingly shaped groove in the cylindrical section of the inner portion of the coupling, which also excludes external contamination from the bearing lubricant. It will be seen that packing 60 serves a dual purpose. It ensures against line fluid reaching and contaminating the grease and it further ensures against the grease migrating under any circumstances and contaminating the line fluid even should the main packing be seriously worn or damaged.

In FIGURE 4 where similar numerals have been used as in FIGURE 2 the construction, shown on a larger scale is everywhere the same as in that figure except for the total absence of the secondary packing and its mounting groove. Under certain types and conditions of use the added protection of this packing may be unnecessary.

In FIGURE 5 the disclosure differs from that in FIGURE 2 only by the use of a substantially square section packing 160 in the secondary position, fitting in a correspondingly shaped channel and having a V-groove 165 in its left face to ensure its properly expanding should any fluid pressure bear thereon. The main packing 154 is shown similar to that in the previous embodiment but is somewhat greater in length and comes closer to filling its packing compartment. This packing 154 may be of different material from that shown at 54 so that one may be adapted for high pressure fluid and the other for low or medium pressure ones. Conversely, one may be for gas and the other for liquid. The ease of interchanging this is evident.

In FIGURE 6 the secondary packing 260 is an O-ring of somewhat greater dimension than that shown in FIGURE 2, and the bottom wall of the channel in which it fits is continuous with that of the main-packing channel rendering the chamfer on the rear corner of the flange of less importance than in the other embodiments. The main packing 254 is of a laminated type including several chevrons 266 which may be of reinforcing material to adapt the swivel for certain specific uses.

The swivel pipe coupling shown and described comprises a minimum of carefully selected elements so arranged as to provide a greater range of performance and utility, at low cost, than can be found in any known commercial device.

I claim:

1. A swivel pipe coupling of the type described, in combination, a two-part outer member and a hollow inner member each constructed to be connected into a pipe system; said inner member having an external cylindrical bearing section with two longitudinally spaced circumferential ball receiving grooves therein and an adjoining cylindrical stem of a substantially less diameter than the first section; said outer member including a sleeve having a bearing section internally sized to fit loosely over said external cylindrical bearing section for substantially its full length and having cooperating ball grooves, an integrally extending portion bored larger than the internally sized portion, internally threaded and extending over said stem, and a separable closure part having an extension threaded externally to engage said integral portion and internally counter-bored to form with said stem an annular packing chamber whose maximum diameter is of the order of that of the first cylindrical section of said inner member; said sleeve having an outwardly extending radial wall terminating the bearing section and a cylindrical wall between it and the internal threads of substantial thread crest diameter; a flange ring having an internal bore slightly greater in diameter than and fitted over said stem, a radial face engaging said radial wall but entirely clear of the inner member and an external diameter less than that of said last-mentioned cylindrical wall; said closure part and said larger bored integral portion of said sleeve having engaging faces to provide positive limit means for the threaded engagement thereof, the inner end of said closure part extension terminating to provide slight clearance with the other face of said flange whereby the latter is free to move radially in respect to the outer member; balls in said grooves connecting said inner and outer members for relative rotation; and a pressure expansible packing in said packing chamber between said stem and counter-bore and having an end area bearing on the other face of said flange ring, said flange being of such thickness as to resist bending on application of axial forces due to fluid pressure in the swivel, access of fluid in said coupling to the opposite end of said packing being through a space between the end of said stem and said closure part, axial forces due to the pressure of said fluid forcing the packing against the flange ring and the outer portion of the opposite radial face of the latter against said radial wall of said sleeve whereby relative rotational movement takes place between the packing and said cylindrical stem to thereby reduce the friction between the relatively rotatable members.

2. In a swivel type pipe coupling having hollow inner and outer members in partial overlapping and rotative relationship, two spaced rings of ball bearings directly engaging in circumferential grooves in said members, said inner member having a cylindrical stem of less diameter than its overlapping portion extending longitudinally from one end thereof, said outer member having a counter-bored integral portion extending from the corresponding end thereof over said stem, a radial wall at the inner end of said counter-bore, a closure part for said outer member having an extension, engaging threads on said extension and in the outer part of the length of said integral portion, means positively limiting the extent of thread engagement whereby the end of said extension is spaced from said radial wall, a separate floating annular flange ring with a bore slightly greater in diameter than and fitted over said stem, said flange ring having a substantial clearance space at its periphery from the wall of said counter-bore, and having a thickness sufficient to resist bending on application of axial forces due to fluid pressure, but slightly less than the spacing of said extension end from said radial wall, said extension having a counter-bore to provide a chamber between its counter-bore wall and said stem, and a flexible resilient packing in said chamber engaging the stem surface and last mentioned counter-bore wall and with one end against the inner portion of one radial face of said flange to transmit pressure of fluid in the coupling to said radial wall on the outer member through the outer portion of the other radial wall of said flange to thereby cause relative rotational movement to occur between the inner wall of the packing and said stem to reduce the friction between the relatively rotatable members.

3. The swivel coupling of claim 2 in which a secondary packing closes the space between the inner and outer members in an area between the said radial wall and the nearest bearing groove, a venting hole extends through between the bore and periphery of said flange, and a venting hole extends through said counter-bored integral portion of said outer member to atmosphere, said holes both entering the clearance space between the said periphery of said flange and the wall of said counter-bore.

4. The swivel coupling of claim 2 in which a secondary packing closes the space between the inner and outer members in an area between the nearest bearing and said flange ring, and said packings and flange are removable on separating the outer member parts while leaving the ball bearing connection between the inner and outer members intact.

5. In a swivel pipe coupling a two-part outer member and a telescoping hollow inner member having an external cylindrical section with two longitudinally spaced, circumferential, ball receiving grooves therein and a cylindrical stem of a substantially less diameter; said outer member including a sleeve having a portion fitted over substantially the full length of cylindrical section and having cooperating ball grooves, balls in said grooves connecting said members together rotatively, said outer member having an integral portion bored larger than said section, internally threaded and extending over said stem, and a separable closure part having an extension threaded externally, engaging said integral portion and internally counter-bored to form with said stem an annular packing chamber whose maximum diameter is of the order of that of the external cylindrical section; said sleeve having an outwardly extending radial wall terminating the bearing section and a cylindrical wall of substantial thread crest diameter between the radial wall periphery and the internal threads, a separate flange ring having an internal bore slightly greater in diameter than and fitted over said stem, an external diameter less than that of said last-mentioned cylindrical wall and a radial face the outer part only of which engages said radial wall; positive stop means for the threaded connection between the parts of said outer member whereby the inner end of said closure part extension so terminates as to provide slight clearance with the other face of said flange whereby the latter is free to move radially in respect to the outer member, a flexible packing in said packing chamber between said stem and counter-bore and having an end area engaging said other face of said flange ring, said flange ring being of such thickness as to resist bending on the application of axial forces due to fluid pressure in the coupling, and means providing access of fluid in said coupling to the opposite end of said packing through a space between the end of said stem and said closure part, the axial force on the opposite end of said packing due to the internal fluid pressure forcing the packing against the flange ring and the latter against said radial wall of the sleeve to effect sliding between the packing and the cylindrical stem and thereby reduce friction between the relatively movable members.

6. A swivel pipe coupling having in combination, a hollow inner member having an external cylindrical section with longitudinally spaced circumferential ball receiving grooves therein and a cylindrical adjoining stem of a lesser outside diameter; an outer member including a sleeve having a bearing section internally sized to fit loosely over said first cylindrical section for substantially its full length and having cooperating ball grooves, an integral portion internally of larger diameter than the bearing section, internally threaded for the outer portion of its length and extending over said stem, and a separable hollow closure part having a reduced diameter extension threaded externally to engage said sleeve portion and internally counter-bored to form with said stem an annular packing chamber whose maximum diameter is of the order of that of the cylindrical section of the inner member; a radial wall extending outwardly from one end of the bearing section and a cylindrical wall between the radial wall periphery and the internal threads of substantial thread crest diameter, a floating flange ring having an internal bore slightly greater in diameter than and mounted on said stem, having a radial face engaging said radial wall and an external diameter less than that of said last-mentioned cylindrical wall; means limiting movement of said closure part into said sleeve, the inner end of said closure part extension terminating with slight clearance from said flange whereby the latter is free to move radially in respect to the outer member, balls in said grooves connecting said inner and outer members for relative rotation, and a pressure expansible packing in said packing chamber between said stem and counter-bore having an end area bearing on the other face of said flange ring, the end of said stem being slightly spaced from and confronting the closure part adjacent the fluid passage therein to give the pressure fluid access to the opposite end of said packing whereby to force it against one face of the flange ring near its inner diameter and thereby force the other face of the ring near its outer diameter against the radial wall of said outer member to reduce friction between the relatively movable members, said ring being of sufficient thickness and strength to resist bending by said fluid pressure forces.

References Cited in the file of this patent

UNITED STATES PATENTS

| | | |
|---|---|---|
| 1,912,494 | Patterson | June 6, 1933 |
| 2,029,598 | Timbs | Feb. 4, 1936 |
| 2,083,599 | Fox | June 15, 1937 |
| 2,265,267 | Cowles | Dec. 9, 1941 |
| 2,274,233 | Dewald | Feb. 24, 1942 |
| 2,279,969 | Casperson | Apr. 14, 1942 |
| 2,396,123 | Phillips | Mar. 5, 1946 |
| 2,430,445 | Aamodt | Nov. 11, 1947 |
| 2,459,981 | Warren | Jan. 25, 1949 |
| 2,518,318 | Hinkson | Aug. 8, 1950 |
| 2,698,192 | Bily | Dec. 28, 1954 |
| 2,823,074 | Bernard | Feb. 11, 1958 |
| 2,906,548 | Faccou | Sept. 29, 1959 |

FOREIGN PATENTS

| | | |
|---|---|---|
| 151 | Great Britain | Jan. 2, 1908 |